May 29, 1962  R. F. PAULSON  3,036,377
CITRUS FRUIT MEMBRANE CUTTER
Filed Feb. 1, 1960

INVENTOR.
ROY F. PAULSON
BY
Reynolds, Beach & Christensen
ATTORNEYS

United States Patent Office 3,036,377
Patented May 29, 1962

3,036,377
CITRUS FRUIT MEMBRANE CUTTER
Roy F. Paulson, 4935 28th Ave. S., Seattle, Wash.
Filed Feb. 1, 1960, Ser. No. 5,758
6 Claims. (Cl. 30—24)

This invention relates to a cutter for cutting the membrane coverings of the sector shaped segments exposed in the substantially hemispherical half of a citrus fruit produced by cutting the fruit along a substantially diametral plane to divide each of its segments in half.

In preparing citrus fruit and particularly grapefruit and large oranges to be eaten at the table, it is customary simply to cut the fruit in half along a substantially diametral plane bisecting all the sections of the fruit so that the cut surface of the fruit in each half displays the pulp separated into sector shaped half segments by membranous dividers constituting the coverings of the half segments. To eat the fruit, then, a spoon is used to scoop out the pulp of each half segment confined between the rind and two radial divider membranes.

The pulp of such citrus fruit is juicy but such juice is confined in small sacs of which the segments are composed. These sacs adhere quite strongly to the membranous coverings of the segments so that when sufficient force is exerted with a spoon to pry the pulp out of a half segment some of such sacs invariably are ruptured, frequently causing juice to squirt from them with considerable force which frequently is disconcerting.

In order to facilitate removal of pulp from half segments of a citrus fruit which has been cut in half in the manner described above, various expedients have been utilized heretofore. One expedient has been to cut around the pulp just inwardly of the rind, sometimes with a curved knife generally conforming to the shape of the rind, and then to make radial cuts generally along the lines of the membranous dividers. This technique has the disadvantage of being messy and of wasting fruit. Moreover, usually some portions of the membranous dividers are not severed completely so that part of a cut section is still connected to the rind and it is more or less difficult to sever the connection. Another expedient which has been used is to cut out the central part of such a fruit half so that the half segments and membranous dividers are disconnected at the center. This is a difficult operation to execute, wastes fruit and is messy. Moreover, in both of these operations some danger is involved because the knife being used can slip and cut its user.

It is a principal object of the present invention to provide a cutter for the radial membranes of a citrus fruit half of the type described which can be used easily and safely with a minimum of mess.

Another object is to provide such a cutter which can be operated quickly to cut the radial membranes of a citrus fruit half sufficiently effectively to enable the half sections to be scooped out of the rind easily with a spoon at the table.

It is also an object to provide such a cutter which will thus cut the membranes of a half citrus fruit substantially to avoid waste of the pulp when the fruit is eaten yet which will be effective for use in cutting fruit halves of different sizes over a considerable range.

A cutter capable of accomplishing these objects is composed of a head carrying at least one and preferably a plurality of cylindrical shells projecting axially from the head and having their free edges sharpened to form cutting edges. Each such shell projects farther from the head than any shell outwardly from it. In addition, the space within each shell is vented to permit the escape of air which would otherwise be trapped in the shell if the head were imperforate and the open end of the shell were closed as it is by the pulp of a half citrus fruit when it is being used to cut the radial membranes of such a fruit half.

Figure 1:
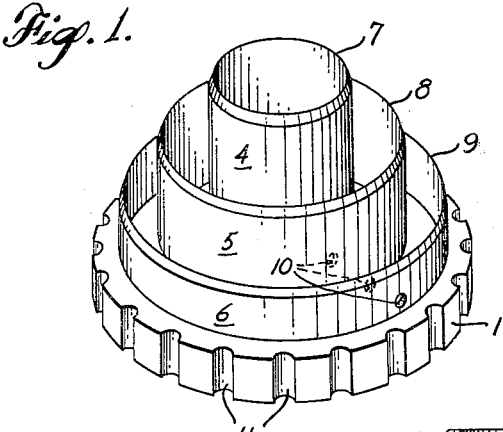
FIGURE 1 is a top perspective view of one form of cutter and FIGURE 2 is a central longitudinal section through such cutter and through a citrus fruit half showing the cutter in use.

The cutter includes a head 1 preferably of circular shape. In the form shown in FIGURES 1 and 2, the head includes a circular plate 2 and a rim 3 integral with the plate and formed as a peripheral flange projecting from one side of the plate. From the opposite side of the plate project a plurality of cylindrical cutting shells each having one edge integral with the plate 2. These shells project axially from the plate and are disposed in concentric relationship as shown in FIGURE 1. In the preferred type of shell arrangement three shells 4, 5 and 6 are provided, the inner shell 4 being the longest and projecting farthest from the plate 2, the outer shell 6 being the shortest and the intermediate shell 5 projecting from the plate 2 farther than the outer shell but not as far as the inner shell 4. Such intermediate shell 5 is located generally midway between the inner shell 4 and the outer shell 6 and the difference in length between the inner shell and the intermediate shell is approximately the same as the difference in length between the intermediate shell and the outer shell.

Each of the cylindrical shells 4, 5 and 6 has its free edge 7, 8 and 9 remote from plate 2 sharpened. It is convenient to sharpen such edges by beveling them from the outer side of the shell toward the inner side. If these shells are made of metal the free edges of the shells can be ground in this shape. It is, however, practical to make the cutter of cast plastic material in which case the edges of the shells can be formed initially with sharp edges. As shown best in FIGURE 2, the size of the shells 4, 5 and 6 will be selected generally in conformity with the size and shape of a half citrus fruit in which the radial membranes are to be cut. The head 1 can be somewhat smaller in diameter than the diameter of the cut face of the fruit half because it is not necessary that the outer shell 6 be located at the periphery of the fruit half. In order to cut the membranes sufficiently effectively, however, it is desirable that they be cut to a sufficient depth and the cutting edges 7, 8 and 9 should penetrate into the membranes a substantial distance.

A cutter having three concentric cutting shells as illustrated in the drawings has been found to be adequate for the purpose of cutting the radial membranes of citrus fruit halves such as half grapefruit. The diameter of the inner shell 4 may be approximately one-third of the diameter of the head and the axial projection of such inner shell from the head 1 may be approximately equal to the radius of the head. The diameter of the intermediate shell 5 may be equal to approximately two-thirds of the diameter of the head 1 and the axial projection of this shell from the head may be approximately one-third of the diameter of the head. The outer shell 6 should be located adjacent to the rim of the head and it may project from the head approximately one-half as far as the shell 5. The projection of the rim 3 should be sufficient so that a good grip can be obtained on the head.

Figure 2:
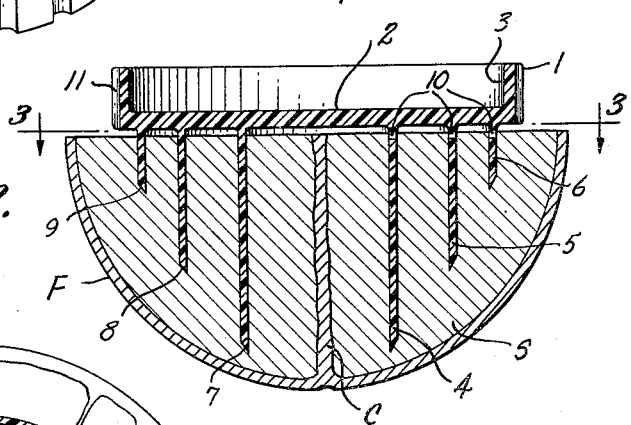
Figure 3:
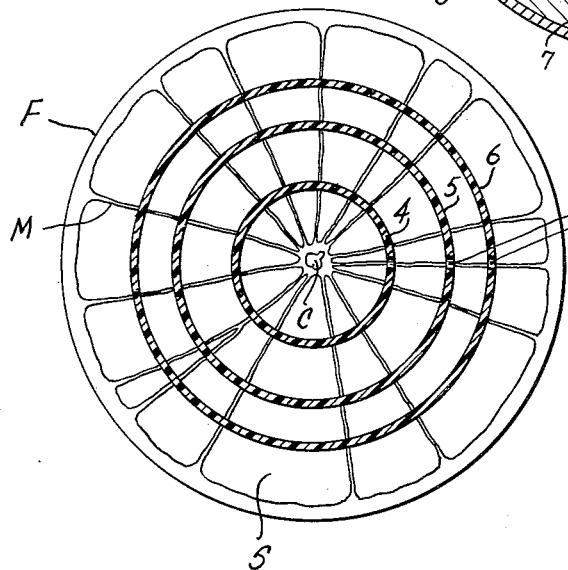
FIGURE 3 is a sectional view taken on line 3—3 of FIGURE 2 showing the cutting shells in section and the cut surface of the citrus fruit half in plan.

As the cutter is pressed into the cut side of a citrus fruit half as shown in FIGURES 2 and 3, it will be evident that the pulp of the fruit will seal the continuous cutting edge 7 of the shell 4 first. As the cutter is moved farther into the fruit, more of the pulp will move into the space within the inner shell so that the air within the shell will be moved toward the head 2. Unless some vent is provided for such air it will be compressed within the inner shell. Similarly, as the cutter is moved farther into the fruit, the cutting edge 8 of the intermediate shell 5 will engage and be sealed by the pulp of the fruit. As the cutter is then moved farther into the fruit half, air would be moved toward the head 2 in the space between the shell 4 and the shell 5 and would be compressed in this space if no vent were provided. Ultimately the cutting edge 9 of the outer shell 6 will engage and be sealed by the pulp of the fruit as the cutter is moved farther into it so that the air in the space between the shell 5 and the shell 6 will be moved toward the head and compressed if no vent is provided.

The amount of compression to which the air within the shells 4, 5 and 6 is subjected will, of course, depend upon the internal volume of these shells and the extent to which the cutting shells are pressed into the fruit to reduce the free space within them. In FIGURE 2 the cutter is shown as having been pushed very far into the fruit. In any event the air within the inner shell 4 would be compressed more than the air between the shells 4 and 5 and this air would be compressed more than the air between the shells 5 and 6. Compression of such air may not be detrimental but it is preferred that the spaces within these shells be vented at the inner ends of the shells. For this purpose vent holes 10 shown in FIGURES 1 and 2 may be provided adjacent to the head. Such holes can be formed simply by drilling aligned radial holes through the three shells. Alternatively, vents could be provided through the plate 2 to the space within the inner shell 4, the space between the shell 4 and the shell 5, and the space between the shell 5 and the shell 6.

In use a smoother cut can be effected and the cutting operation can be accomplished more easily by rotating the cutter about its axis as its cutting shells are pushed into the pulp of the fruit. The cutting edges 7, 8 and 9 thus execute a slicing action through the radial membranes and pulp of the fruit. To improve the grip of a person's hand on the rim 3 of the head particularly for rotating the cutter to some extent at least in the manner described, it is preferred that the rim 3 have an external roughened or knurled surface which can be provided by forming axial grooves 11 in the rim. In the alternate form of cutter shown in FIGURE 4 the cutting shells 4, 5 and 6 are the same as in the cutter shown in FIGURES 1, 2 and 3, but in this instance the rim 12 of the head has axial ribs projecting from it to provide a gripping surface.

Figure 4:
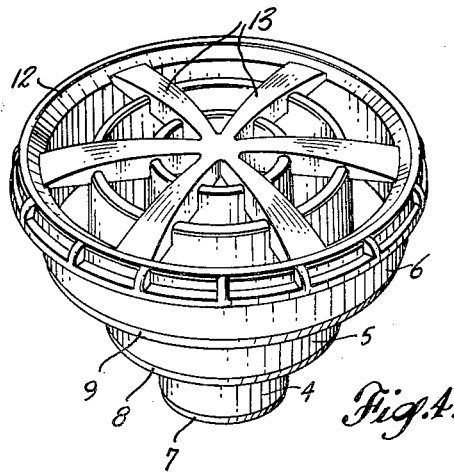
FIGURE 4 is a top perspective view of a modified type of cutter in position inverted from the position of the cutter shown in FIGURE 1.

The cutter of the type shown in FIGURE 4 is particularly suitable to be made of cast plastic material and the cutting shells can also be made of such material and fabricated integral with the head in a single molding operation. In order to save material the head of this cutter is of skeleton type in which the inner shell 4 and intermediate shell 5 are integrated with the rim 12 through radial spokes 13. Each of the cylindrical shells 4 and 5 has its anchored edge formed integral with and bridging circumferentially between the spokes 13 in radially spaced relationship so that such elements provide mutual support.

Thus, the spokes 13 hold the cutting shells 4 and 5 in spaced concentric relationship while the anchored ends of such shells interconnect the spokes between their inner ends and the rim 12 to strengthen the spokes against bending forces. In a cutter construction of this type the skeletal head affords venting for the space within the inner shell 4 and the spaces between the shells 4 and 5 and 5 and 6.

It will be evident that as the cutter is pressed axially into the cut half of a citrus fruit F and simultaneously rotated somewhat, the cutting edges 7, 8 and 9 will slice through the radial membranes M forming the coverings of the fruit segments S progressively as the cutter is moved into the fruit. The cutter should be moved into the fruit so that the cutting edge 7 of the inner shell 4 will penetrate nearly to the rind. While the membranes M even after this cutting operation will still be joined at the center C of the fruit, the membranes will be cut in a plurality of locations to a depth sufficient that any half segment S can be scooped out of the fruit with comparative ease and with little hindrance by the portions of the membranes between the cuts. Also, the pulp will be cut to a considerable depth into sections but the outer part of each segment will still join such cut sections. The pulp may be removed from the rind in sizes convenient for bites from such a cut fruit half easily and with minimum risk of rupturing juice containing sacs of the pulp sufficiently violently to cause the juice to squirt out of the fruit.

I claim as my invention:

1. A citrus fruit membrane cutter comprising a head, a plurality of cylindrical concentric shells projecting axially in one direction from said head, each inner one of said shells projecting from said head farther than each one of said shells located outwardly of such inner shell, the free edges of said shells being sharpened, and said head including a rim and intersecting spokes integral with and interconnecting said rim and the ends of said concentric shells adjacent to said head.

2. A citrus fruit membrane cutter comprising a head, a cylindrical shell projecting axially from said head, and a second cylindrical shell projecting axially from said head, having a diameter approximately twice as great as the diameter of said first shell, disposed concentrically with said first shell and of an axial extent beyond said head approximately two-thirds as great as the axial extent of said first shell beyond said head, the free edges of said shells being sharpened to form cutting edges.

3. The citrus fruit membrane cutter defined in claim 2, and a third cylindrical shell of a diameter greater than the second cylindrical shell, disposed concentrically with the first and second cylindrical shells and of an axial extent beyond the head approximately half as great as the axial extent of the second shell beyond the head, said third shell having its free edge sharpened.

4. A citrus fruit membrane cutter comprising a head of substantially circular shape, a cylindrical shell having a diameter approximately one-third as great as the diameter of said head and projecting axially from said head a distance approximately one-half as great as the diameter of said head, and a second shell having a diameter greater than that of said first shell, disposed concentrically with said first shell and projecting from said head a distance less than the distance that said first shell projects from said head, the free edges of said shells being sharpened to form cutting edges.

5. A citrus fruit membrane cutter comprising a head of substantially circular shape, a cylindrical shell having a diameter approximately one-third as great as the diameter of said head and projecting axially from said head a distance approximately one-half as great as the diameter of said head, and a second shell having a diameter approximately two-thirds as great as the diameter of said head, disposed concentrically with said first shell and projecting from said head a distance approximately one-third as great as the diameter of said head, the free edges of said shells being sharpened to form cutting edges.

6. The citrus fruit membrane cutter defined in claim 5, and a third cylindrical shell of a diameter greater than the second cylindrical shell, disposed concentrically with the first and second cylindrical shells and of an axial extent beyond the head approximately half as great as the axial extent of the second shell beyond the head, said third shell having its free edge sharpened.

References Cited in the file of this patent

UNITED STATES PATENTS

| | | |
|---|---|---|
| 468,893 | Palmiter | Feb. 16, 1892 |
| 978,790 | Thomas | Dec. 13, 1910 |
| 1,738,547 | White | Dec. 10, 1929 |
| 1,866,073 | Aberle | July 5, 1932 |
| 2,478,571 | Creider | Aug. 9, 1949 |
| 2,629,168 | Shpentuk | Feb. 24, 1953 |